US008836708B2

(12) United States Patent
Letellier et al.

(10) Patent No.: US 8,836,708 B2
(45) Date of Patent: Sep. 16, 2014

(54) DEVICE FOR THE PARALLEL PROCESSING OF A DATA STREAM (75) Inventors: Laurent Letellier, Venelles (FR); Mathieu Thevenin, Saclay (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 585 days.

(21) Appl. No.: 13/121,417

(22) PCT Filed: Jun. 8, 2009

(86) PCT No.: PCT/EP2009/057033
§ 371 (c)(1),
(2), (4) Date: May 25, 2011

(87) PCT Pub. No.: WO2010/037570
PCT Pub. Date: Apr. 8, 2010

(65) Prior Publication Data
US 2011/0273459 A1 Nov. 10, 2011

(30) Foreign Application Priority Data

Sep. 30, 2008 (FR) .................................... 08 05369

(51) Int. Cl.
*G06F 15/80* (2006.01)
*G06T 1/20* (2006.01)
(52) U.S. Cl.
CPC . *G06F 15/80* (2013.01); *G06T 1/20* (2013.01); *G06F 15/8015* (2013.01)
USPC ......................................... 345/505; 345/506
(58) Field of Classification Search
CPC ....... G06F 8/443; G06F 8/445; G06F 8/4442; G06F 8/447; G06F 8/4441; G06F 7/57; G06F 9/3885; G06F 9/3001; G06F 15/7867; G06F 7/5443; G06F 15/8007; G06F 9/38; G06F 9/46; G06F 9/505; G06F 12/00; G06F 17/16; G06F 2209/5018; G06F 8/41; G06F 9/3004; G06F 9/3851; G06F 9/3853; G06F 9/5027; G06T 1/20; G06T 15/005; G06T 2210/52; G09G 5/393; G09G 5/363
USPC .............. 345/505, 506; 712/300, 36, 22, 214; 382/27, 303; 708/607; 717/159
See application file for complete search history.

(56) References Cited

U.S. PATENT DOCUMENTS 7,711,938 B2 * 5/2010 Wise et al. ..................... 712/300
7,788,468 B1 * 8/2010 Nickolls et al. ................. 712/22

(Continued)

OTHER PUBLICATIONS

Kuroda, et al., "Multimedia Processors" Proceedings of the IEEE, vol. 86, No. 6, Jun. 1998. XP011044031.

*Primary Examiner* — Kee M Tung
*Assistant Examiner* — Nicole Gillespie
(74) *Attorney, Agent, or Firm* — Baker & Hostetler LLP (57) ABSTRACT A device for processing a data stream originating from a device generating matrices of Nl rows by Nc columns of data includes K computation tiles and interconnection means for transferring the data stream between the computation tiles. At least one computation tile includes: one or more control units to provide instructions, n processing units, each processing unit carrying out the instructions received from a control unit on a neighborhood of Vl rows by Vc columns of data, a storage unit to place the data of the stream in the form of neighborhoods of Vl rows by (n+Vc−1) columns of data. The storage unit includes a block of shaping memories of dimension Vl×Nc and a block of neighborhood registers of dimension Vl×(n+Vc−1), an input/output unit to convey the data stream between the interconnection means and the storage unit on the one hand, and between the processing units and the interconnection means on the other hand.

16 Claims, 8 Drawing Sheets

(56) References Cited

U.S. PATENT DOCUMENTS 7,912,889 B1 * 3/2011 Juffa et al. .................... 708/607
8,250,555 B1 * 8/2012 Lee et al. ...................... 717/159
2007/0242074 A1 * 10/2007 Stuttard et al. ................ 345/505
2009/0187736 A1 * 7/2009 Raichelgauz et al. .......... 712/36

* cited by examiner

DEVICE FOR THE PARALLEL PROCESSING OF A DATA STREAM

CROSS-REFERENCE TO RELATED APPLICATIONS

This application is a National Stage of International patent application PCT/EP2009/057033, filed on Jun. 8, 2009, which claims priority to foreign French patent application No. FR 08 05369, filed on Sep. 30, 2008, the disclosures of which are incorporated by reference in their entirety.

FIELD OF THE INVENTION

The invention relates to a device for processing a data stream. It lies in the field of computation architectures and finds particular utility in embedded applications of multimedia type integrating a video sensor. It involves notably mobile telephony, mobile multimedia readers, photographic apparatus and digital camcorders. The invention also finds utility in applications relating to telecommunications and, more generally, in any signal processing chain for processing digital data at high rate.

BACKGROUND OF THE INVENTION

Signal processing in general, and processing of images in particular, require significant computational powers, especially over the last few years with the rapid increase in the resolution of image sensors. In the field of embedded applications aimed at the general public, heavy constraints in terms of fabrication cost are added to the constraints of electrical consumption (of the order of a few hundred milliwatts). To respond to these constraints, image processing is commonly carried out on the basis of dedicated computation modules operating in data flow mode. The "data flow" mode, as it is commonly known in the literature, is a data processing mode according to which the data entering the computation module are processed as and when they arrive, at the rate of their arrival, a result being provided as output from the computation module at the same rate, optionally after a latency time. Dedicated computation modules make it possible to comply with the fabrication cost constraints on account of their small silicon area and the performance constraints, notably as regards computational power and electrical consumption. However, such modules suffer from a flexibility problem, it not being possible for the processing operations supported to be modified after the construction of the modules. At the very best, these modules are parametrizable. Stated otherwise, a certain number of processing-related parameters may be modified after construction.

A solution to this lack of flexibility consists in using completely programmable processors. The processors most commonly used are signal processors, well known in the literature under the acronym "DSP" for "Digital Signal Processor". Drawbacks of these processors are their significant silicon footprint and their electrical consumption, often rendering them ill-adapted to highly constrained embedded applications.

Compromises between dedicated computation modules and completely programmable processors are currently under development. According to a first compromise, a circuit comprises a data processing unit having very long instruction words, called a VLIW ("Very Long Instruction Word") unit, and a unit making it possible to execute an instruction on several computation units, called an SIMD ("Single Instruction Multiple Data") unit. In certain current constructions, computation units of VLIW and/or SIMD type are implanted in the circuit as a function of the necessary computational power. The choice of the type of unit to be included in the circuit, of their number and of the way they are chained together is decided before the construction of the circuit by analyzing the application code and necessary resources. The order in which the units are chained together is fixed and it does not make it possible to subsequently change the chaining of the processing operations. Moreover, the units are globally fairly complex since the control code for the application is not separate from the processing code. Thus, the processing operators of these units are of significant size, thereby leading to an architecture whose silicon area and electrical consumption are more significant for equal computational power.

According to a second compromise, a C-language code may be transformed into a set of elementary instructions by a specific compiler. The set of instructions is then implanted on a configurable matrix of predefined operators. This technology may be compared with that of FPGA, which is the acronym for "Field Programmable Gate Array", the computation grain being bigger. It does not therefore make it possible to obtain programmable circuits, but only circuits that can be configured by code compilation. If it is desired to integrate parts of program code that are not provided for at the outset, computation resources which are not present in the circuit are then necessary. It therefore becomes difficult or indeed impossible to implement this code.

According to a third compromise, the data are processed by a so-called parallel architecture. Such an architecture comprises several computation tiles linked together by an interconnection bus. Each computation tile comprises a storage unit making it possible to store the data locally, a control unit providing instructions for carrying out processing on the stored data, processing units carrying out the instructions received from the control unit on the stored data and an input/output unit conveying the data either between the interconnection bus and the storage unit, or between the processing units and the interconnection bus. This architecture presents several advantages. A first advantage is the possibility of modifying the code to be executed by the processing units, even after the construction of the architecture. Furthermore, the code to be executed by the processing units generally comprises only computation instructions but no control or address computation instruction. A second advantage is the possibility of carrying out in parallel, either an identical processing on several data, or more complex processing operations for one and the same number of clock cycles by profiting from the parallel placement of the processing units. A third advantage is that the computation tiles may be chained together according to the processing operations to be carried out on the data, the interconnection bus conveying the data between the computation tiles in a configurable order. Moreover, the parallel architecture may be extended by adding further computation tiles, so as to adapt its processing capabilities to the processing operations to be carried out. However, the management of the data in the computation tiles is complex and generally requires significant memory resources. In particular, when a computation tile is performing a processing on a data neighborhood, all the data of this neighborhood must be available to it simultaneously, whereas the data arrive in the form of a continuous stream. The storage unit of the computation tile must then store a significant part of the data of the stream before being able to perform a processing on a neighborhood. This storage and the management of the stored data require optimization so as to limit the silicon area and the electrical consumption of the parallel architecture while offering computational performance adapted to the processing of a data flow.

SUMMARY OF THE INVENTION

An aim of the invention is to propose a computation structure which is programmable and adapted to the processing of a data stream, notably when processing operations must be carried out on neighborhoods of data. For this purpose, the subject of the invention is a device for processing a data stream originating from a device generating matrices of Nl rows by Nc columns of data. The processing device comprises K computation tiles and interconnection means for transferring the data stream between the computation tiles. At least one computation tile comprises:
- one or more control units making it possible to provide instructions,
- n processing units, each processing unit carrying out the instructions received from a control unit on a neighborhood of Vl rows by Vc columns of data,
- a storage unit making it possible to place the data of the stream in the form of neighborhoods of Vl rows by (n+Vc−1) columns of data, the storage unit comprising a block of shaping memories of dimension Vl×Nc and a block of neighborhood registers of dimension Vl×(n+Vc−1),
- an input/output unit making it possible to convey the data stream between the interconnection means and the storage unit on the one hand, and between the processing units and the interconnection means on the other hand.

An advantage of the invention is that the storage unit of a computation tile in which a processing on a neighborhood of data is carried out is particularly adapted to such processing, notably in terms of dimensioning of the memory registers and management of accesses to the memory registers by the processing units.

BRIEF DESCRIPTION OF THE DRAWINGS

The invention will be better understood and other advantages will become apparent on reading the detailed description of an embodiment given by way of example, this description being offered in relation to appended drawings which represent:

FIG. 1, an exemplary device for processing a data stream according to the invention, FIG. 2, an exemplary processing unit comprising a very long instruction word processor, FIG. 3, an exemplary management of a block of shaping memories, FIG. 4, an exemplary management of a block of neighborhood registers in a case where the data of the block of shaping memories are in order, FIG. 5, an exemplary management of the block of neighborhood registers in the case where the data of the block of shaping memories are not in order, FIG. 6, a set of timecharts illustrating the temporal management of a block of neighborhood registers, FIG. 7, an exemplary embodiment of a computation tile comprising several processing units in parallel, FIG. 8, a set of timecharts illustrating the temporal management of a storage unit of a computation tile comprising two processing units in parallel, FIG. 9, an exemplary embodiment of an input/output unit, FIG. 10, an exemplary implementation of the device according to the invention for video images, FIG. 11, a schematic representation of a Bayer filter, FIG. 12, an example of format registers allowing the splitting of the data of the stream, FIG. 13, an exemplary mechanism allowing access to a register containing metadata, FIG. 14, an exemplary embodiment of a computation tile comprising several processing units, the processing units receiving specific instructions as a function of metadata, FIG. 15, an exemplary embodiment of an insertion operator.

DETAILED DESCRIPTION

The subsequent description is given in relation to a processing chain for a video data stream originating from a video sensor such as a CMOS sensor. The processing chain makes it possible for example to reconstruct color images on the basis of a monochrome video sensor to which is applied a color filter, for example a Bayer filter, to improve the quality of the images restored, or else to carry out morphological operations such as erosion/dilation or the low-level part in the processing of pixels of advanced applications such as image stabilization, red eye correction or the detection of faces. However, the device according to the invention may be equally suitable for processing a stream of data other than those arising from a video sensor. The device can for example process an audio data stream or data in Fourier space. Generally, the device exhibits particular interest for the processing of data which, although being conveyed in the form of a stream, possess a coherence in a two-dimensional space.

Figure 1:
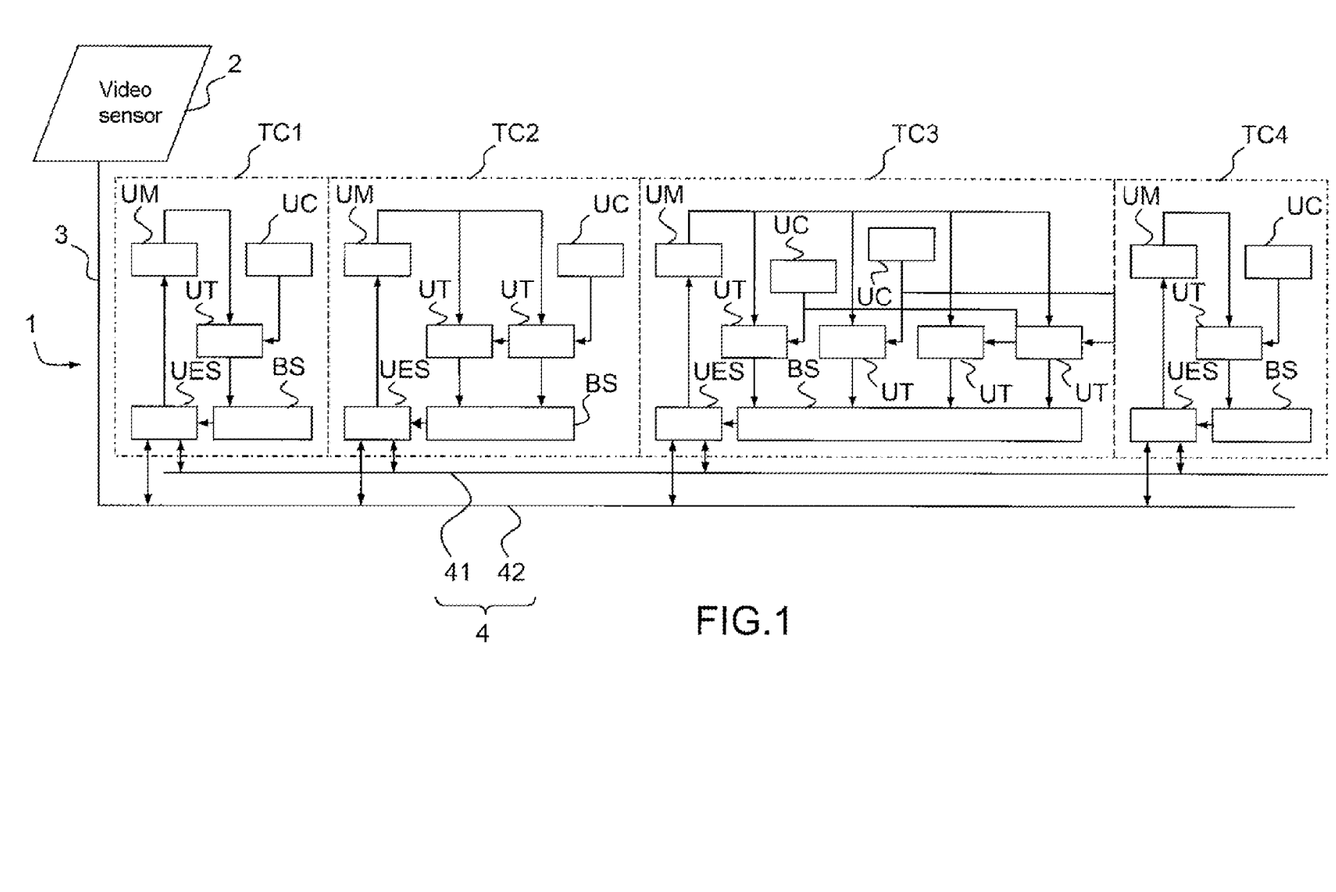

FIG. 1 schematically represents a device 1 for processing a data stream according to the invention. A video sensor 2 generates a digital data stream directed toward the processing device 1, by way of a data bus 3. The data arising from the video sensor 2 are referred to as raw data. The device 1 processes these raw data so as to generate as output data referred to as final data. To this end, the device 1 according to the invention comprises processing units UT, control units UC, storage units UM and input/output units UES grouped into K computation tiles TC. The device 1 also comprises interconnection means 4 such as data buses 41, 42. These interconnection means 4 make it possible to transfer the data stream between the various computation tiles TC. Each computation tile TC comprises a storage unit UM, one or more control units UC, at least one processing unit UT per control unit UC and an input/output unit UES. The storage units UM make it possible to shape the data of the stream so that they can be processed by the processing units UT as a function of code instructions delivered by the control units UC. The input/output units UES make it possible to convey the data stream between the interconnection means 4 and the storage units UM on the one hand, and between the processing units UT and the interconnection means 4 on the other hand. In the example of FIG. 1, the device 1 comprises 4 computation tiles TC, the first and the fourth computation tile TC1 and TC4 each comprising a storage unit UM, a control unit UC, a processing unit UT and an input/output unit UES, the second computation tile TC2 comprising a storage unit UM, a control unit UC, two processing units UT and an input/output unit UES, and the third computation tile TC3 comprising a storage unit UM, two control units UC, two processing units UT per control unit UC and an input/output unit UES. Each computation tile TC makes it possible to carry out a function or a series of functions on the basis of code instructions. Within the framework of a video processing chain, each computation tile TC carries out for example one of the following functions: correction of the white balance, dematrixing, noise reduction, contour accentuation. The composition of a computation tile TC depends notably on the function or functions that it has to carry out. In particular, the number of control units UC making up a computation tile TC depends on the number of different processing operations having to be carried out simultaneously by the computation tile TC. Since each control unit UC within the computation tile TC is able to comprise its own code, a computation tile TC comprises for example as many control units UC as distinct processing operations to be carried out in parallel on the data.

The processing units UT may be more or less complex. In particular, they can comprise either simple dedicated operators, for example composed of logic blocks, or processors. Each processing unit UT is independent of the others and can comprise different operators or processors. The dedicated operators are for example multipliers, adders/subtracters, assignment operators or shift operators. Advantageously, the processing units UT contain only the dedicated operators commonly used for the processing envisaged.

A processing unit UT can also comprise a processor. In a first embodiment, the processor comprises a single arithmetic and logic unit. In a second embodiment, the processor is a very long instruction word (VLIW) processor. Such a processor can comprise several arithmetic and logic units. In a preferred variant, a VLIW processor comprises for example instruction decoders, now no arithmetic and logic units but only computation operators, a local memory and data registers. Advantageously, only the computation operators necessary for the execution of the computation codes to be carried out are implanted in the processor during its design. Thereafter, two or more of them may be used in the same cycle to perform distinct operations in parallel. The unused operators do not receive the clock signals. The electrical consumption of the processing units UT is thereby reduced. These advantageous characteristics have led to a particular embodiment, represented in FIG. 2. In this figure, the VLIW processor comprises two pathways. Stated otherwise, it can execute up to two instructions in one and the same clock cycle. The processor comprises a first instruction decoder 21, a second instruction decoder 22, a first set of multiplexers 23, a set of computation operators 24, a second set of multiplexers 25, a set of data registers 26 and a local memory 27. The instruction decoders 21 and 22 receive instructions originating from a control unit UC. As a function of the instructions received, the multiplexers 23 direct data to be processed onto an input of one of the computation operators 24 and the multiplexers 25 direct the processed data to the data registers 26. The data registers 26 containing the processed data may be linked up with outputs of the processor. The size of the very long instruction words is for example 48 bits, i.e. 24 bits per pathway. The computation operators 24 thus work in 24-bit precision. Within the framework of video processing and more particularly of image reconstruction on the basis of data arising from a video sensor, the computation operators 24 are advantageously two adders/subtracters, a multiplier, an assignment operator, an operator for writing to the local memory and a shift operator.

Figure 2:
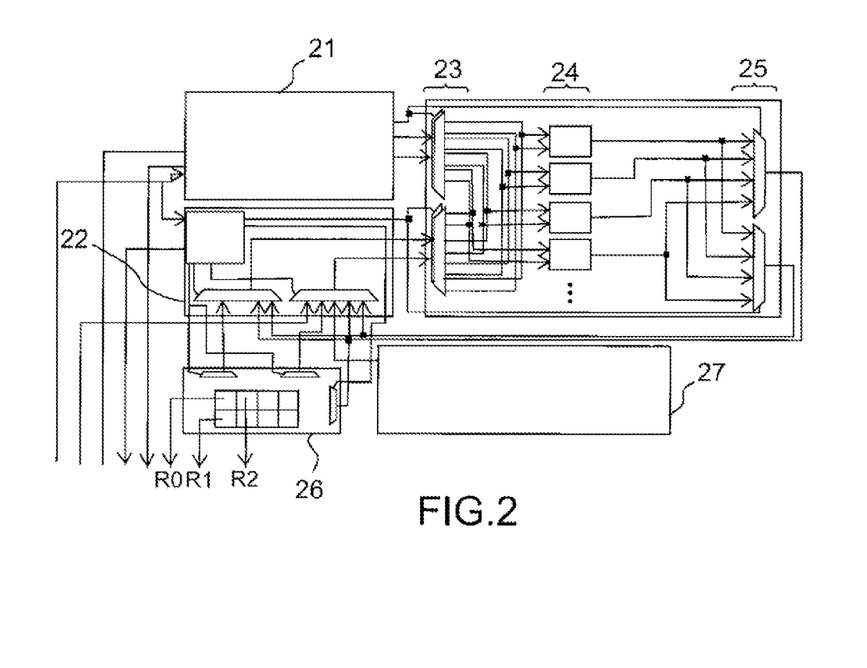

Still according to a particular embodiment, the execution of the instructions may be conditioned by setting a flag. The instruction can then be supplemented with a prefix indicating the execution condition. The flag is for example a bit of a register containing the result of an instruction executed during the previous clock cycle. This bit can correspond to the zero, sign or carry indicators of the register. At each instruction, the instruction decoders 21 and 22 test the setting of the flag related to this instruction. If this setting complies with the execution condition, the operation is executed, otherwise it is replaced with a non-operation instruction, called NOP. At the end of the cycle of each instruction, the value of the flag is dispatched to the two instruction decoders 21 and 22 so as to be able to test the condition, if any, of a following instruction.

According to a particular embodiment, each instruction word is coded on 24 bits. The first 3 bits (bits 0 to 2) can contain the instruction condition, the following two bits (bits 3 and 4) can code the mode of access to the datum, the sixth, seventh and eighth bits (bits 5 to 7) can code the identifier of the operation, the following four bits (bits 8 to 11) can designate the destination register, the following four bits (bits 12 to 15) can designate the source register and the last 8 bits (bits 16 to 23) can contain a constant. An exemplary programming using such a coding is given in the annex.

The device 1 for processing a data stream comprises M control units UC, M lying between 1 and N, N being the number of processing units UT. In the case where the number M of control units UC is equal to the number N of processing units UT, each processing unit UT can have its own control unit UC. In the case where the number M of control units UC is less than the number N of processing units UT, then at least one computation tile TC comprises several processing units UT, as in the example of FIG. 1 (TC2, TC3). A control unit UC of this computation tile TC then provides instructions to several processing units UT, these processing units UT being said to be in parallel. A control unit UC can comprise a memory making it possible to store the code instructions for the processing unit or units UT that it serves. A control unit UC can also comprise an ordinal counter, an instruction decoder and an address manager.

Within the framework of a processing of raw images obtained by a color filter, the address manager and the ordinal counter make it possible to apply a different processing as a function of the color of the current pixel. In particular, the code may be split up into code segments, each code segment comprising instructions for one of the colors of the filter. The address manager can indicate to the ordinal counter the color of the current pixel, for example red, green or blue. According to a particular embodiment, the address manager comprises a two-bit word making it possible to code up to four different colors or natures of pixels in a pixel neighborhood of size two by two. At each clock cycle, the ordinal counter is incremented by a shift value (offset) depending on the value of the word. The ordinal counter then makes it possible to point at the code segment corresponding to the color of the current pixel. The four shift values are determined during compilation of the code as a function of the number of instructions of each of the code segments. The use of an address manager and of an ordinal counter makes it possible to unburden the programmer and thus avoids his having to determine the nature of the current pixel per program. This management becomes automatic and allows a shorter execution time and simpler programming. In the particular case where the processed images are monochrome, the same instructions are applied to all the pixels. The shift values are then equal and determined so that the ordinal counter points at the first instruction after the initialization code.

The device 1 for processing a data stream also comprises K storage units UM, K lying between 1 and M. A computation tile TC can comprise several control units UC, as in the example of FIG. 1 (TC3). The same data of the stream, or neighboring data, that are present in the storage unit UM can then be processed differently by the processing units UT of the computation tile, each control unit UC providing instructions to at least one processing unit UT. The main function of the storage units UM is to shape the data of the stream so as to facilitate access to these data by the processing units UT.

According to a first embodiment, a storage unit UM comprises an equal number of data registers to the number of processing units UT situated in the computation tile TC of the storage unit UM considered.

According to a second embodiment, particularly adapted to the processing of video images, a storage unit UM shapes the data in the form of neighborhoods and manages access to the data when processing units UT are in parallel. Such a storage unit UM can comprise a first memory block called a block of shaping memories and a second memory block called a block of neighborhood registers. Since the storage units UM of the various computation tiles TC are independent of one another, the device 1 for processing the data stream can comprise at one and the same time storage units UM according to the first embodiment and storage units UM according to the second embodiment. The second embodiment makes it possible to carry out processing operations on data neighborhoods. For a video image, a neighborhood may be defined as a mesh of adjacent pixels, this mesh generally being square or at least rectangular. A rectangular mesh may be defined by its dimension Vl×Vc where Vl is the number of pixels of the neighborhood row-wise and Vc is the number of pixels of the neighborhood column-wise. The block of shaping memories stores the data of the stream so that they can be copied in a systematic manner with each arrival of a new datum. The block of neighborhood registers allows access to the pixels of the current neighborhood by the processing unit or units UT of the computation tile considered.

Figure 3:
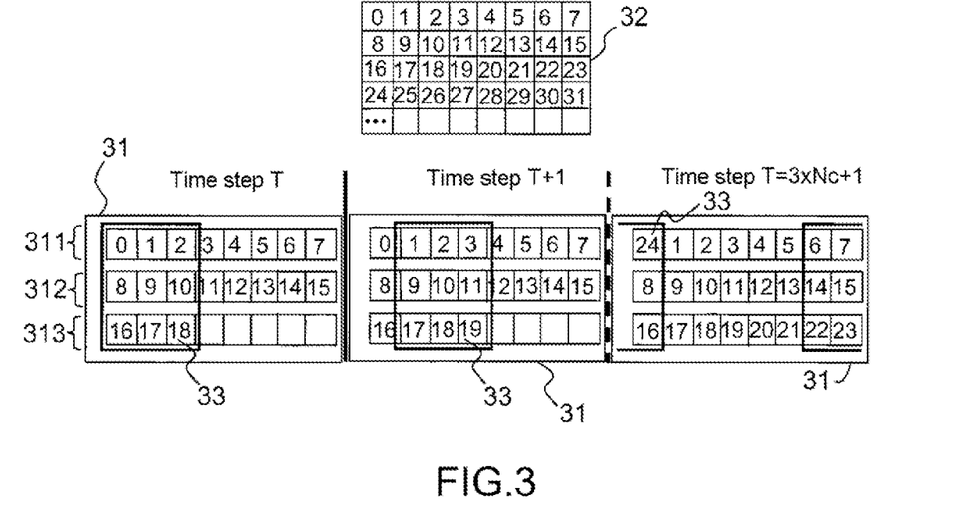

FIG. 3 illustrates, by a block 31 of shaping memories represented at different time steps T, an exemplary management of the block 31 for data corresponding to a stream of values of pixels originating from a device generating matrices of Nl rows by Nc columns of data, such as a video sensor 32. The video sensor 32 has resolution Nc columns by Nl rows of pixels. The resolution is for example VGA (640×480), "HD Ready" (1080×720) or "Full HD" (1920×1080). The pixels are dispatched and stored as and when they arrive to the block 31 of shaping memories. This block 31 is advantageously of dimension Vl×Nc so as to make it possible to generate neighborhoods of dimension Vl×Vc. Stated otherwise, the block 31 comprises Vl×Nc memory cells arranged according to a mesh of Vl rows and Nc columns. Usual values for Vl are three, four, five, six or seven. Physically, the block 31 can consist of one or more memory modules. The block 31 may be managed as a shift register. Stated otherwise, at each time step or clock cycle, the data are shifted so as to leave room for the new incoming datum. Advantageously, the block 31 is managed as a conventional memory in such a way that the pixels are copied in their order of arrival.

In the latter case and in a first embodiment, a counter CPT that is incremented on each incoming datum is considered. Each new pixel coming from the data stream is then copied into a cell 33 of the block 31 of shaping memories situated in the row corresponding to E(CPT/Nc), where E(x) is the function returning the integer part of a number x, and in the column corresponding to the remainder of CPT/Nc. The counter CPT is reset to zero each time it reaches the value equal to Vl×Nc.

In a second embodiment, a counter CPTC that is incremented after each incoming datum and a counter CPTL that is incremented each time the counter CPTC reaches the value Nc are considered. The counter CPTC is reset to zero each time it reaches the value Nc and the counter CPTL is reset to zero each time it reaches the value Vl. Each new pixel coming from the data stream is then copied into the cell 33 whose row index corresponds to the value CPTL and whose column index corresponds to the value CPTC.

Figure 4:
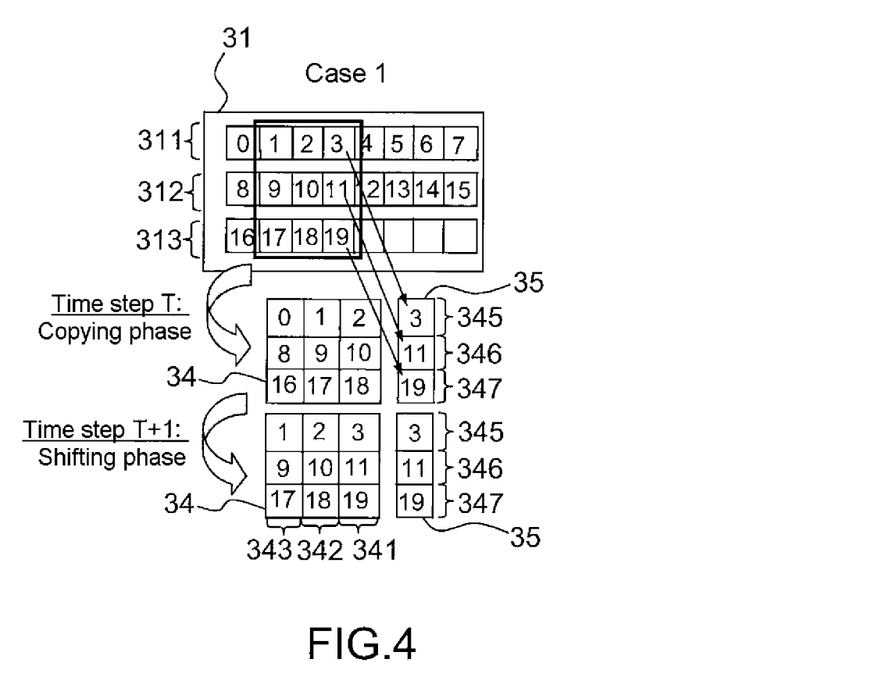

FIG. 4 illustrates an exemplary management of the block of neighborhood registers for data originating from the block 31 of shaping memories. The block 34 of neighborhood registers comprises for example a number of neighborhood registers equal to Vl×Vc. These neighborhood registers are arranged in the same manner as the neighborhood of pixels, that is to say they form a mesh of Vl rows and Vc columns of registers. The copying of the data of the block 31 of shaping memories to the neighborhood registers starts as soon as there is a number of data in the block 31 equal to (Vl−1)×Nc+1. In the case of a neighborhood of dimension 3×3, represented in FIG. 4, the copying of the data thus starts when two rows of data plus one datum are present in the block 31. In one embodiment, the data are copied at each clock cycle in groups of Vl data of one and the same column. At a given time step, the index of the column to be copied is given by the value of CPTC. This column in fact comprises the last pixel that arrived in the block 31. Advantageously, a column 35 of Vl data registers is added to the neighborhood registers. This column 35 makes it possible to disable accesses to the registers of the block 34 by the processing units UT only during a single clock cycle, that of the shifting of the values in the block 34. Otherwise, accesses are disabled at one and the same time during the shifting of the values and during the copying of the data from the block 31. During a first clock cycle, the data of the column, indicated by the counter CPTC, of the block 31 are copied into the registers of the column 35. During a second clock cycle, all the data of the block 34 and of the column 35 are shifted by one column. Thus, for a neighborhood of dimension 3×3, in one and the same clock cycle, the data of a first column 341 are shifted toward a second column 342, while the data of this column 342 are shifted toward a third column 343 and the data of the column 35 are shifted toward the column 341.

Figure 5:
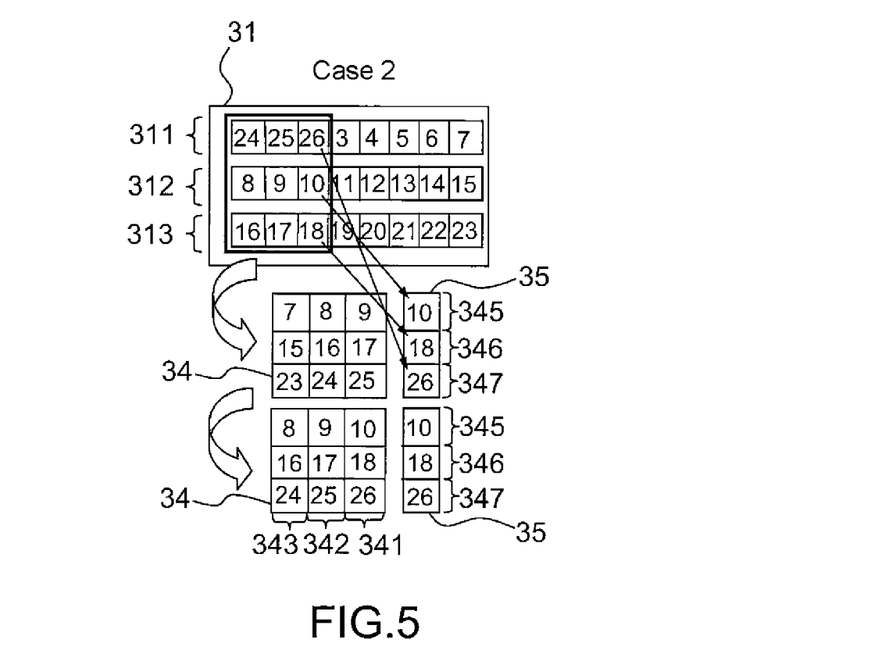

On account of the cyclic management of the block 31, the data are not always stored in the block 31 according to the order of the rows of the video sensor 32. In this case, the pixels must be copied into the column 35 or, if appropriate, into the column 341 of the block 34, in a different order. FIG. 5 illustrates such a case where the last data of the stream are stored in the first row of the block 31. In the case of a neighborhood of dimension 3×3, the copying of the pixels into column 35 may be managed by the following placement steps:
the last arriving pixel always goes in the third row 347 of the column 35 of the neighborhood registers;
if the counter CPTL is equal to zero, stated otherwise if the last pixel has arrived at the first row 311 of the block 31, then
the pixel of the second row 312 of the block 31 is copied to the first row 345 of the column 35,
the pixel of the third row 313 of the block 31 is copied to the second row 346 of the column 35;
if the counter CPTL is equal to one, stated otherwise if the last pixel has arrived at the second row 312 of the block 31, then
the pixel of the first row of the block 31 is copied to the second row 346 of the column 35,
the pixel of the third row 313 of the block 31 is copied to the first row 345 of the column 35;
if the counter CPTL is equal to two, stated otherwise if the last pixel has arrived at the third row 313 of the block 31, then
the pixel of the first row 311 of the block 31 is copied to the first row 345 of the column 35,
the pixel of the second row 312 of the block 31 is copied to the second row 346 of the column 35.

More generally, in the case of a neighborhood of size V1×Vc, the pixel of the block 31 of shaping memories which is situated in the row RowNo and in the column indicated by CPTC is notably copied to column 35, or, if appropriate, into the first column 341 of the block 34, in the row defined by (CPTL+RowNo+1) modulo V1. RowNo takes all the positive integer values lying between 1 and V1 so as to allow the copying of the pixels for all the rows of the neighborhood.

Figure 6:
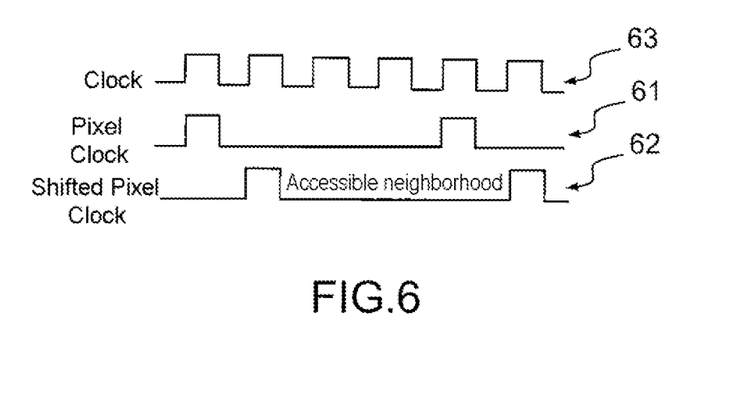

According to a particular embodiment, the copying of the pixels of the block 31 into the column 35 of registers is not performed simultaneously with the shifting of the pixels in the block 34. This embodiment allows the processing units UT to access the data present in the block 34 of neighborhood registers during a longer period. FIG. 6 represents a set of timecharts making it possible to implement this embodiment. The temporal shift between the copying of the pixels and the shifting of the pixels into the block 34 may be effected by introducing, in addition to a first clock, called the pixel clock 61 and making it possible to regulate the data stream and the copying of the pixels, a second clock, called the shifted pixel clock 62. This shifted pixel clock 62 may be at the same frequency as the pixel clock 61 but shifted in time. This shift corresponds for example to a period of the clock of the processing units UT 63. The data present in the block 34 are then accessible throughout the period separating two clock ticks of the shifted pixel clock 62. Access to the neighborhood registers by the processing units UT may be effected through an input/output port, for example integrated into each processing unit UT, the number of whose connections is equal to the number of neighborhood registers, multiplied by the size of the data. Each neighborhood register is linked to the input/output port. Advantageously, each storage unit UM comprises a multiplexer the number of whose inputs is equal to the number of neighborhood registers of the block 34 and the number of whose outputs is equal to the number of data that can be processed simultaneously by the processing unit UT of the computation tile TC considered. The processing unit UT can then comprise an input/output port the number of whose connections is equal to the number of data that can be processed simultaneously, multiplied by the size of the data. In this instance, a processing unit UT comprising a VLIW processor with two pathways processing data on 12 bits can comprise an input/output port with 24 (2×12) connections.

Figure 7:
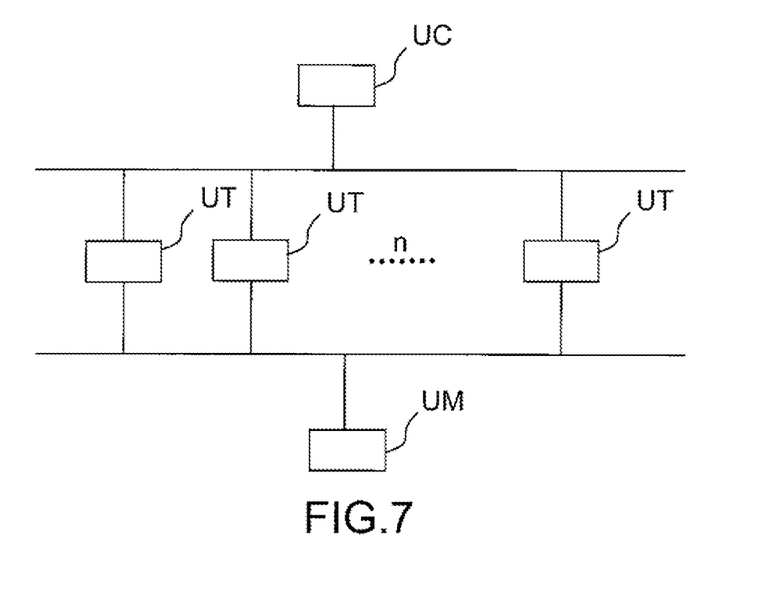

According to a particular embodiment, one and the same storage unit UM provides data to several processing units UT in parallel. Stated otherwise, the processing device 1 comprises a computation tile TC comprising several processing units UT. This embodiment advantageously uses the storage units UM comprising a block 31 of shaping memories and a block 34 of neighborhood registers. However, the dimension of the block 34 of neighborhood registers has to be adapted. FIG. 7 illustrates an exemplary computation tile TC where a storage unit UM provides data to n processing units UT in parallel, n being less than or equal to the number N of processing units UT of the device 1. The instructions are provided to the n processing units UT by one or more control units UC. According to this embodiment, the block 34 of neighborhood registers is of dimension V1×(n+Vc−1). Stated otherwise, the block 34 comprises V1×(n+Vc−1) data registers arranged according to a mesh of V1 rows and n+Vc−1 columns. For example, for three processing units UT in parallel and a neighborhood of dimension 5×5, a mesh of 7 (=3+5−1) columns and 5 rows of registers are necessary. Moreover, a column 35 of V1 data registers may be added to the block 34. Thus, access to the neighborhood registers by the processing units UT is disabled only during a single cycle of the processing units UT. The copying of the data of the block 31 to the column 35 of registers then starts when the block 31 of shaping memories comprises (V1−1)×Nc+1 data. Moreover, for n processing units UT in parallel, the processing of the data is carried out when n new data have arrived in the block 31. Access to the neighborhood registers by the n processing units UT can also be carried out through an input/output port integrated into each processing unit UT. The number of connections of the input/output port of each processing unit UT is then equal to the number of neighborhood registers to which the processing unit UT requires access, multiplied by the size of the data. Likewise, the storage unit UM can comprise a multiplexer the number of whose inputs is equal to the number of neighborhood registers of the block 34 and the number of whose outputs is equal to the number of data that can be processed simultaneously by the n processing units UT, each processing unit UT comprising an input/output port the number of whose connections is equal to the number of data that can be processed simultaneously by said processing unit UT, multiplied by the size of the data.

Figure 8:
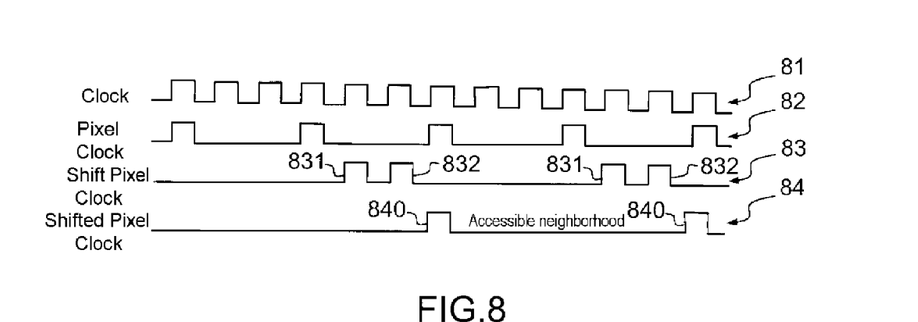

FIG. 8 illustrates, by a set of timecharts, an exemplary management of a computation tile TC comprising two processing units UT in parallel. A first timechart 81 represents the clock of the processing units UT of rate $F_{archi}$. A second timechart 82 represents the pixel clock of rate $F_{pixel}$. The pixel clock fixes the rate of arrival of the data of the stream which are dispatched into the block 31 of shaping memories. The rate $F_{archi}$ may be equal to p×$F_{pixel}$ with p a positive integer. According to FIG. 8, the rate $F_{pixel}$ is four times greater than the rate $F_{archi}$. Each processing unit UT thus has four clock cycles per datum to be processed. A third timechart 83 represents a shift clock. This clock generates two successive clock ticks 831, 832 after one clock tick out of two of the pixel clock. At each clock tick of the shift clock, the data of the block 34 are shifted by one column. A fourth timechart 84 represents the shifted pixel clock. The rate of this clock is substantially equal to half the rate a clock tick 840 being generated after the two clock ticks 831, 832 of the shift clock. Generally, the rate of the shifted pixel clock is equal to 1/n times the rate $F_{pixel}$ of the pixel clock. At each clock tick 840 of the shifted pixel clock, the data are copied from the block 31 to the block 35. Access to the neighborhood registers by the processing units UT is possible between two clock ticks 840 of the shifted pixel clock.

According to a particular embodiment, the interconnection means 4 comprise a number Nb_bus of data buses. Nb_bus may be defined by the following relation:

$$Nb\_bus = K \times (F_{pixel}/F_{archi}) + 1.$$

This embodiment makes it possible to connect the K computation tiles TC to one another by carrying out a spatiotemporal multiplexing whose temporal multiplexing ratio Mux_t is defined by the relation:

$$Mux\_t = F_{archi}/F_{pixel}.$$

The temporal multiplexing ratio Mux_t makes it possible to define an equal number of time intervals, the read-access and write-access authorizations possibly being defined for each time interval. For example, for a rate $F_{pixel}$ equal to 50 MHz and a rate $F_{archi}$ of 200 MHz, the four computation tiles TC of FIG. 1 may be chained in an arbitrary order if the interconnection means 4 comprise a minimum of two (4×(50/200)+1) data buses, the computation tiles TC being addressed by a temporal multiplexing of ratio four (=200/50).

Figure 9:
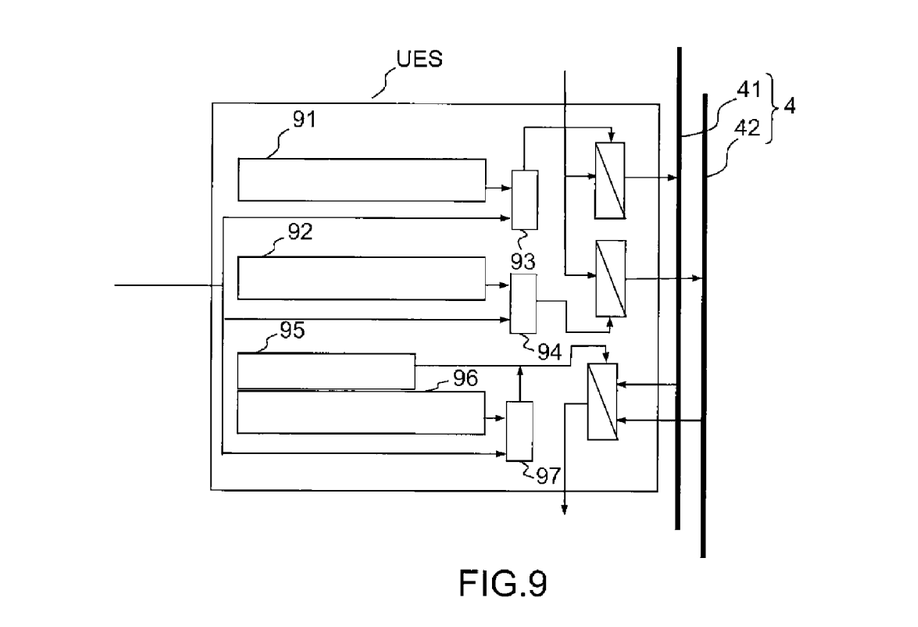

According to this embodiment, each input/output unit UES can manage the read-access and write-access authorizations as a function of the number Nb_bus of buses and of the temporal multiplexing ratio Mux_t. In particular, each input/ output unit UES can comprise registers making it possible to determine the time intervals during which the computation tile TC considered has a read-access or write-access authorization on one of the data buses and, for each of these time intervals, the data bus for which the read- or write-access is authorized. An input/output unit UES comprises for example, for the management of the write-access authorizations, Nb_bus registers of size log 2(Mux_t) bits, where log 2(x) is the function returning the logarithm to base 2 of the number x and, for the management of the read-access authorizations, a register of size log 2(Nb_bus) bits specifying the index of the bus to be read and a register of size log 2(Mux_t) bits specifying the time interval. An exemplary embodiment of such an input/output unit UES is represented in FIG. 9. The input/output unit UES comprises two registers 91 and 92 of 2 bits each, the register 91 managing the write-access authorization on the bus 41 and the register 92 managing the write-access authorization on the bus 42. The content of the registers 91 and 92 is compared with the value of the current time interval, for example by comparators 93 and 94 and, in the case of equality, the writing of the data is authorized on the bus 41 or 42 concerned. The input/output unit UES also comprises a register 95 of 1 bit specifying the index of the bus 41 or 42 to be read and a register 96 of 2 bits specifying the time interval for the reading. The content of the register 96 is also compared with the current time interval, for example by a comparator 97 and, in the case of equality, the reading of the data is authorized on the bus 41 or 42 concerned. This embodiment exhibits the advantage that each input/output unit UES individually manages the access authorizations between the computation tiles TC and the buses 41 and 42. Consequently, no centralized control facility is necessary. The value of the registers of each input/output unit UES is fixed when booting the system as a function of the desired chaining of the computation tiles TC. An unused computation tile TC will be able to have the values of the registers of its input/output unit UES initialized so as to have no right to read or write on the bus 41 or 42.

According to a particular embodiment, represented in FIG. 1, each computation tile TC furthermore comprises a serial block BS comprising as many data registers as processing units UT present in the tile considered, the size of the registers being of size at least equal to the size of the data of the stream. The serial block BS of a computation tile TC receives as input the data originating from the processing unit or units UT and is connected at output to the input/output unit UES. During a write-authorization on one of the buses 41 or 42, the data present in the serial block (BS) are dispatched sequentially on this bus 41 or 42.

Figure 10:
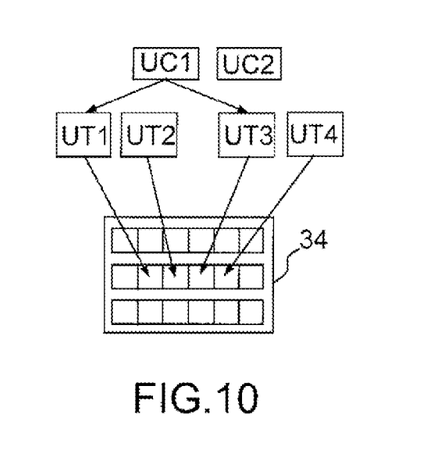
Figure 11:
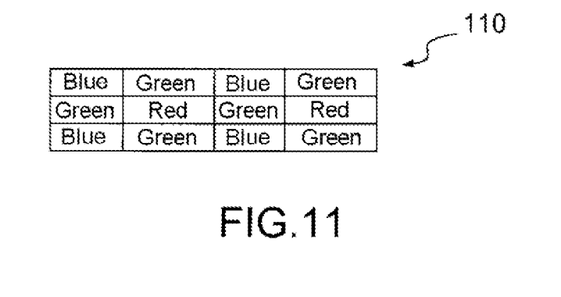

FIG. 10 illustrates an exemplary implementation of the data stream processing device 1 for processing operations to be carried out on raw images. The raw images arise for example from a Bayer filter 110, for example represented in FIG. 11. With such a filter, a color image consists of a mosaic of red, green and blue colored pixels. In particular, the mosaic consists of an alternation of blue and green pixels on a first type of row and of an alternation of green and red pixels on a second type of row, the types of rows also being alternated so as to form diagonals of green pixels. The device 1 according to the invention is particularly adapted to such data. Indeed, for each type of row, it is possible to construct a computation tile TC capable of simultaneously processing several pixels although they are of different color. In one embodiment, represented in FIG. 10, the computation tile TC comprises, on the one hand, a first control unit UC1 providing a first code to a first and to a third processing unit UT1 and UT3 and, on the other hand, a second control unit UC2 providing a second code to a second and to a fourth processing unit UT2 and UT4. The first code is specific to a first color of pixel, for example red, and the second code is specific to a second color of pixel, for example green. The code can also be split up into code segments, an address manager then indicating the color of the processed pixel to the control units UC1 and UC2. The processing units UT1, UT2, UT3 and UT4 then act on the data present in the block 34 of neighborhood registers as a function of the instructions that they receive. In this instance, the first and third processing units UT1 and UT3 act on red pixels and the second and fourth processing units UT2 and UT4 act on the green pixels. The computation tile thus makes it possible to process simultaneously, but distinctly, four pixels of the block 34 of neighborhood registers. In the case of the Bayer filter 110, two control units UC1 and UC2 per row suffice since a row comprises only two different colors. Quite obviously, the computation tiles may be adapted as a function of the color filter applied.

Figure 12:
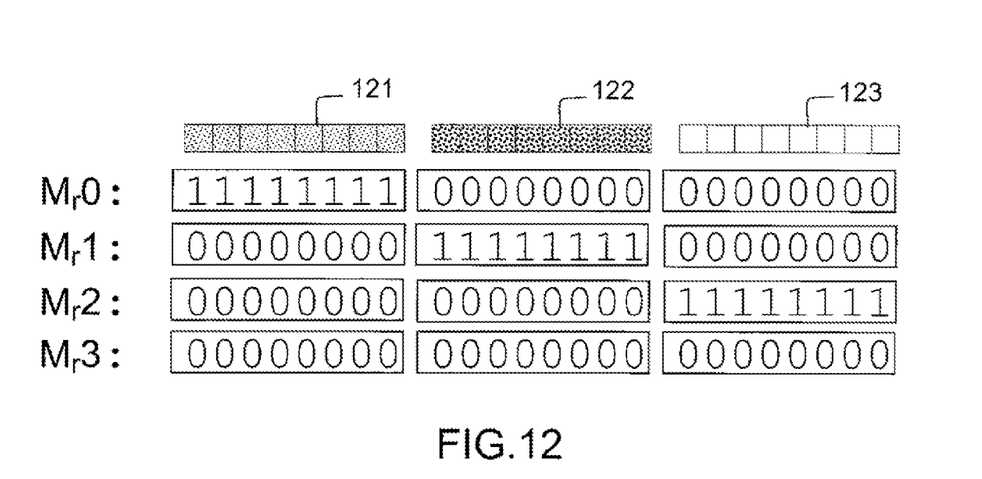
Figure 13:
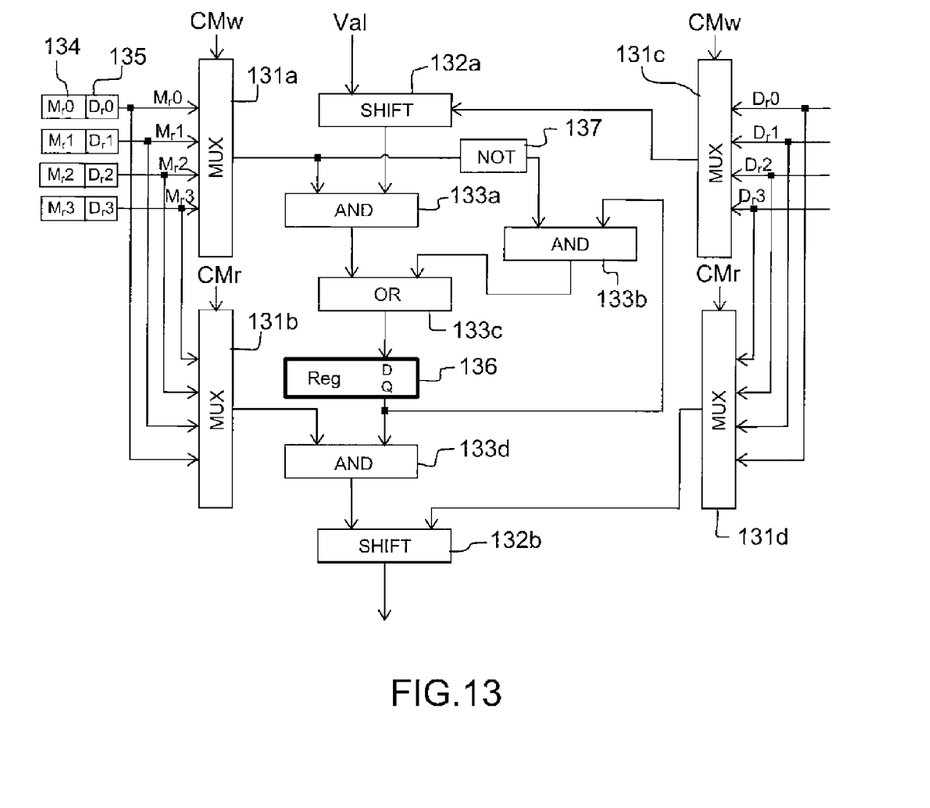

According to a particular embodiment, the data in transit on the interconnection means 4 can contain the datum to be processed, but also additional information, called metadata. These metadata may be used for the transport of various information associated with the data. Within the framework of video image processing, where the data relate to pixels, a metadatum contains for example a value representative of a noise correction or gain correction to be applied to the pixels. The same correction can thus be applied to all the pixels of the image. The metadata can also relate to the three values R, G and B (Red, Green and Blue), intermediate results to be associated with a pixel, or else information making it possible to control the program as a function of the characteristics of the pixel. The use of these metadata makes it possible to easily split the algorithms into several parts and to execute them on various computation tiles TC in multi-SIMD mode. The data in transit may be split according to various formats. The splitting format is specified in format registers $M_r i$, as represented in FIG. 12 (four in number in this particular case $M_r 0$, $M_r 1$, $M_r 2$, $M_r 3$). In the case presented in FIG. 12, a 24-bit data word has been divided into three parts 121, 122, 123 whereas a split of up to four was possible. These format registers are defined for a computation tile TC and their respective value is fixed when loading the program. Accesses to the data are thereafter systematically carried out by a mechanism such as presented in FIG. 13, composed of multiplexers 131a, 131b, 131c, 131d, of shift registers 132a, 132b and of logical gates 133a, 133b, 133c, 133d, 137. Depicted in this FIG. 13 are the format registers $M_r i$ 134 associated with position registers $D_r i$ 135. These registers $D_r i$ 135 are deduced from the registers $M_r i$ 134 by the software for loading the parameters of the program. They make it possible to obtain the start position of the metadatum considered. Only the format registers $M_r i$ 134 are given by the programmer, the position registers $D_r i$ 135 being obtained automatically on the basis of the format registers $M_r i$ 134. In the example of FIG. 13, $M_r 0$ is associated with $D_r 0 = 0$, $M_r 1$ is associated with $D_r 1 = 8$, $M_r 2$ is associated with $D_r 2 = 16$ and $M_r 3$ is associated with $D_r 1 = 24$. A possible implementation of a mechanism for reading and writing the metadata in a 24-bit register 136, allowing access to the communication network, is given in FIG. 13.

For the metadata reading part, the format registers 134 are linked by a multiplexer 131b controlled by the current position to be recovered CMr to a logical AND cell 133d making it possible to set to zero the bits of the register 136 for which the position defined is not relevant, and then the position registers 135 are linked to a shift register 132b which makes it possible to shift the previous result the appropriate number of times so as to have a right-shifted value which is the final value to be recovered for the position considered.

For the metadata writing part, the datum to be written Val is shifted to the appropriate position by virtue of the position register 135 linked to a multiplexer 131c controlled by the current position to be written CMw, which multiplexer 131c is itself linked to a shift register 132a. Only the bits concerned are not set to zero by virtue of a logical AND cell 133a linked to the multiplexer 131a which gives the bits to be masked by virtue of the format register 134. Finally these bits are concatenated with those already present in the destination register 136. For this purpose, the format register 134 is inverted by a logical NOT cell 137 and then a logical AND is carried out by a cell 133b between the inverted format register and the value of the register 136, thus making it possible to fabricate a new mask which drives a logical OR cell 133c making it possible to associate the new datum with the register 136 without touching the bits that are not relevant.

With this management of the metadata, the computation of complex or fixed-point numbers is greatly eased. The processing device according to the invention can thus be advantageously used for the processing operations in the Fourier domain (frequency domain) for example. The processing device according to the invention can also be adapted for accelerating the emulation of floating-point numbers with the aid of fixed-point operators.

Figure 14:
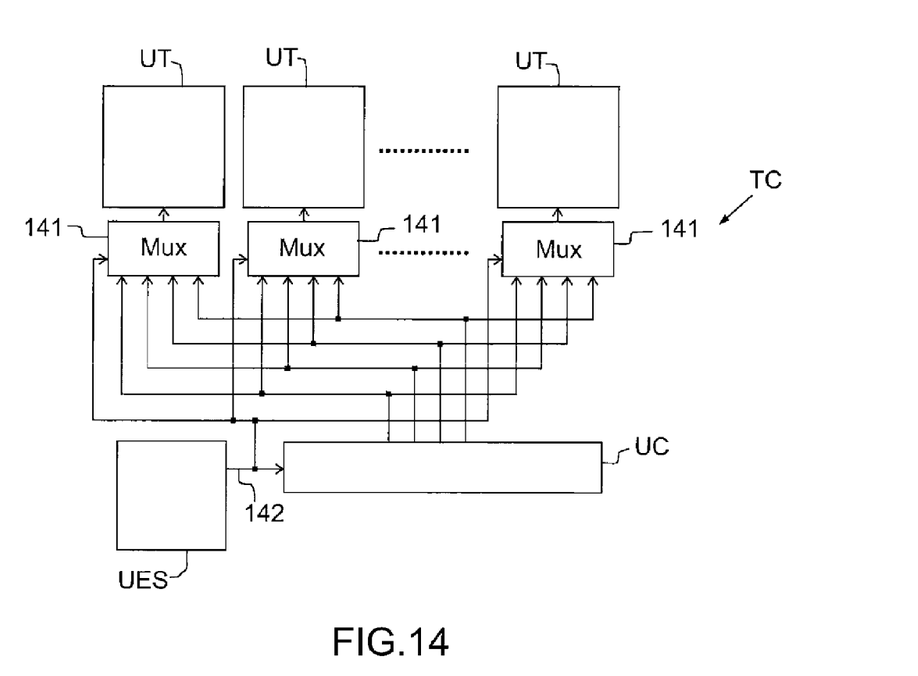
Figure 15:
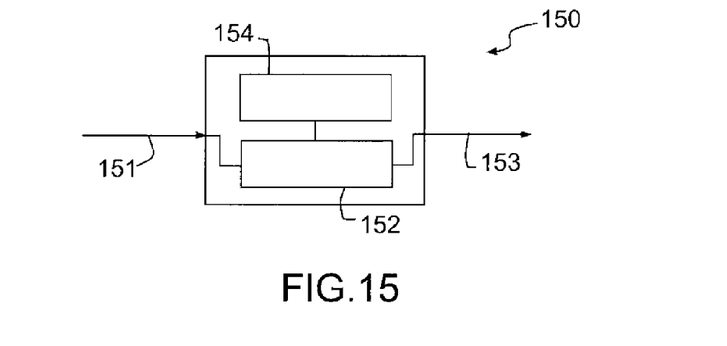

In a multi-SIMD architecture, the metadata may be used to determine the instructions to be transmitted to the processors. Indeed, the complementary information (metadata) can indicate the specific processing to be executed on the data with which they are associated. It suffices to extract the necessary information from the data word as soon as it enters the computation tile TC, illustrated by the example of FIG. 14, and to transmit it to the control unit UC which manages the processing units UT in multi-SIMD mode. In this instance, the metadatum may be extracted when the neighborhood manager organizes the data so as to transmit them to the processing units UT via multiplexers 141. An additional communication 142 between the input/output unit UES and the control unit UC allows the transfer of the metadatum, as represented in FIG. 15.

In order to allow the transfer of the metadata, the interconnection means 4 may be adapted in terms of capacity. In particular, the size of the data buses 41, 42 may be increased as a function of the size of the metadata. Moreover, the device 1 according to the invention can comprise an insertion operator making it possible to concatenate each datum of the stream with a metadatum. FIG. 15 represents such an insertion operator 150. The insertion operator 150 comprises an input bus 151 linked to an input of an insertion block 152 whose output is linked to an output bus 153. The insertion operator 150 can also comprise a memory 154 making it possible to store the metadatum. The memory 154 is linked with the insertion block 152 so as to allow the transfer of the metadatum. The size of this datum must be less than or equal to the difference between the maximum size of the data that can be transferred by the interconnection means 4 and the size of the data of the stream. The size of the input bus 151 must be adapted to the size of the data of the stream whereas the size of the output bus 153 must be adapted to the size of the data of the stream that are concatenated with the metadatum. The insertion operator 150 may be inserted on one of the data buses 41, 42, for example between the video sensor 2 and the computation tiles TC or between two computation tiles TC. In one embodiment, the insertion operator 150 is embodied by a computation tile TC. The computation tile TC then comprises a storage unit UM containing the complementary datum and a processing unit UT making it possible to concatenate the data of the stream with the complementary datum. The complementary datum is for example stored in a data register of the storage unit UM. This embodiment presents the advantage of avoiding the insertion of an additional component into the chain for processing the data stream. It is made possible by virtue of the modularity of the device 1 according to the invention.

ANNEX

Instruction set (on 48 bits: 24 bits per pathway)
Composition of the 24-bit instruction word:

| | | |
|---|---|---|
| 0 ... 2 | -> | 3 Condition bits; |
| 3 ... 4 | -> | 2 Data access mode bits |
| 5 ... 7 | -> | 3 bits Identifying the operation |
| 8 ... 11 | -> | 4 Destination Register bits |
| 12 ... 15 | -> | 4 Source Register bits |
| 16 ... 23 | -> | 8 constant bits |

Prefix of the instructions:

| | |
|---|---|
| F_: | Execution if flag=1 |
| NF_: | Execution if flag=0 |
| fC: | Update of the flag on Carry |
| fZ: | Update of the flag on Result at ZERO |
| fS: | Update of the flag on Sign (1 if >0, 0 if <0) |

Postfix of the instructions:
Allows choice of the source r (D, A, B): R[D] destination register; R[A] source register, R[B] source register
c (D, A, C): R[D] destination register; R[A] source register, C Constant
v (D, A, V): R[D] destination register; R[A] source register, Neighbor[V]
   If the 8 bits of the argument B are formed in the following manner: "10...0<V>" instead of "0..<V>" "the value stored by the register V will be taken as neighbor i.e. Neighbor[R[V]]
m (D, A,M): R[D] destination register; R[A] source register, M Memory address of the local memory Use:
The VLIW allows work on two pathways:

| |
|---|
| OPi(Dm...) / OPj(Dn) |

However, we must have j!=i and m!=n

Except in the case of the complementary conditional instructions:

| |
|---|
| F_OP; No operation if FLAG = 1 |
| NF_OP; No operation if FLAG = 0 |

We can therefore write on the same row

| |
|---|
| F_OP(Dm...) / NF_OP(Dn...) |

Since whatever the value of the Flag, only one will actually be executed

List of operations

```
- NOP
    PREFIX: F__ NF__
    NOP
    F_NOP
    NF_NOP
- LD
    PREFIX: F__ NF__ fZ__ fC__ fS__
    LDr(D, A): R[D] = R[A]
    LDc(D, C): R[D] = C; C signed constant
    LDv(D, V): R[D] = Neig[V]
    LDv(D, V): R[D] = Neig[R[V]]
    LDm(D, M): R[D] = SP[M]
- ADD; SUB; MUL
    PREFIX: F__ NF__ fZ__ fC__ fS__
```

Two signed adders are available, we therefore have ADD0 and ADD1 usable simultaneously without restriction on the pathway.

```
PREFIX: F__ NF__ fZ__ fC__ fS__
ADD0r(D, A, B): R[D] = R[A] + R[B]
ADD0c(D, A, C): R[D] = R[A] + C; C signed constant
ADD0v(D, A, V): R[D] = R[A] + Neig[V]
ADD0v(D, A, -V): R[D] = R[A] + Neig[R[V]]
ADD0m(D, A, M): R[D] = R[A] + SP[M]
```

DITTO for ADD0, SUB0 SUB1, and MUL; all these operations are signed

```
- SHIFT
    PREFIX: F__ NF__ fZ__ fC__ fS__
```

A signed shift operator makes it possible to shift the values to the right or left according to the sign of the shift
A shift of 0 is equivalent to an assignment

```
SHIFTc(D,A,C):
    if (C > 0)
        R[D] = R[A] << C
    if (C < 0)
        R[D] = R[A] >> C
- INV
    INVr(D,A): R[D] = -R[A]
    INVc(D,C): R[D] = -C
    INVv(D,V): R[D] = -Neig[V]
    INVv(D,-V): R[D] = -Neig[R[V]]
    INVm(D,M): R[D] = -SP[M]
```

Program code example

This code carries out the following operation: For a 2×2 neighborhood, sets R1 to the average of the pixels of the neighborhood and sets R0 to 255 if the value of the average is >128; increments R2 if the pixel is at 255 (to have the count of the pixels >128 at the end of the processing)

```
1  #include "macros.h"
2. initcode
3  LDc(R0,0); / NOP
4  LDc(R1,0); / NOP
5  LDc(R2,0); / NOP
6  LDc(R3,0); / NOP
7  LDc(R4,0); / NOP
8  LDc(R5,0); / NOP
9  NOP / NOP
10. pixelcode0
11 LDv(R1,V0) / NOP
12 LDv(R2,V1) / ADD0v(R1,R1,V0)
13 ADD0v(R2,R2,V2) / ADD1v(R1,R1,V3)
14 ADD0(R1,R1,R2) / NOP
15 SHIFTc(R1,R1,-2) / NOP
16 fS_SUBc(R7,R1,128) / NOP
17 F_LDc(R0,0) / NF_LDc(R0,255); in this exceptional case it is
   possible to call LD 2x since one is executed and not the other
18 NF_ADD0v(R2,R2,1) / NOP
19 NOP /NOP
20. pixelcode1
21. pixelcode2
22. pixelcode3
```

It would be possible to write while making maximum benefit of the 2 pathways of the VLIW:

```
10. pixelcode0
11 LDv(R1,V0) / NF_ADD0v(R2,R2,1)
12 LDv(R2,V1) / ADD0v(R1,R1,V0)
13 ADD0v(R2,R2,V2) / ADD1v(R1,R1,V3)
14 ADD0(R1,R1,R2) / NOP
15 SHIFTc(R1,R1,-2) / NOP
16 fS_SUBc(R7,R1,128) / NOP
17 F_LDc(R0,0) / NF_LDc(R0,255)
```

The invention claimed is:

1. A device for processing a data stream comprising matrices of Nl rows by Nc columns of data, said device comprising:
K computation tiles; and
interconnection means for transferring said data stream between the computation tiles, wherein at least one of the computation tiles comprises:
one or more control units to provide instructions to be executed on a subset of Vl rows by (n+Vc−1) columns of said matrix of data, said subset being called a neighborhood;
n processing units, each processing unit executing the instructions received from a control unit on the data stored in a neighborhood register when the accesses to neighborhood registers are authorized;
a storage unit to arrange the data of the stream in the form of neighborhoods of Vl rows by (n+Vc−1) columns of data, the storage unit comprising a block of shaping memories comprising Vl×Nc memory cells arranged according to a mesh of Vl rows and Nc columns and a block of neighborhood registers having a number equal to Vl×(n+Vc−1) of neighborhood registers, wherein said storage unit is configured in such a way that, at each clock, cycle, a column of Vl data of a block of shaping memories is copied to a block of neighborhood register and the accesses to neighborhood registers for processing units are disabled during the copying of a new column of data; and
an input/output unit to convey the data stream between the interconnection means and the storage unit on the one hand, and between the processing units and the interconnection means on the other hand.

2. The device as claimed in claim 1, wherein the block of neighborhood registers further comprises a supplemental column of Vl data registers, said storage unit being configured in such a way that, at each clock cycle, a column of Vl data of a block of shaping memories is copied to said supplemental column of data registers.

3. The device as claimed in claim 2, wherein the column of data of the block of shaping memories labeled by the value of the first counter CPTC is copied, at each clock tick of the data stream, into the column of Vl data registers and then shifted in a first column of the block of neighborhood registers.

4. The device as claimed in claim 3, wherein each datum of the block of shaping memories situated in the column labeled by the value of the first counter CPTC and in the row labeled by RowNo is copied into the column of Vl data registers in the row labeled by (CPTL+RowNo+1) modulo Vl, where RowNo takes all the positive integer values lying between 1 and Vl.

5. The device as claimed in claim 3, wherein the control units each comprise a memory in which is stored a program, the program possibly being split up into code segments, each code segment comprising different instructions for allowing a different processing of the data of the stream as a function of their nature.

6. The device as claimed in claim 5, wherein the data stream originates from a video sensor delivering images of Nc columns by Nl rows of pixels, each image comprising an alternation of two types of rows, each type of row comprising two types of pixels, at least one computation tile comprising two control units, the program of each of these control units being split up into four code segments, each code segment corresponding to the various types of pixels to be taken into account.

7. The device as claimed in claim 6, wherein the type of pixel depends on its color.

8. The device as claimed in claim 6, wherein at least one of the computation tiles comprises:
   a storage unit to store data of the stream;
   a control unit to provide instructions for carrying out a processing on the stored data;
   one or more processing units, each processing unit carrying out the instructions received from the control unit on a part of the stored data; and
   an input/output unit to convey the data stream between the interconnection means and the storage unit on the one hand, and between the processing units and the interconnection means on the other hand, wherein
   the storage unit comprises an equal number of data registers to the number of processing units.

9. The device as claimed in claim 6, wherein the interconnection means comprises a number Nb_bus of data buses defined by the relation:

$$Nb\_bus = Kx(F_{pixel}/F_{archi})+1$$

where $F_{pixel}$ is a frequency of the data stream and $F_{archi}$ is an operating frequency of the processing units (UT), the frequency $F_{archi}$ being equal to $$p \times F_{pixel}$$

with p being a positive integer.

10. The device as claimed in claim 9, wherein the input/output units each comprise Nb_bus registers of size log 2(Mux_t) bits to manage the write-access authorizations, a register of size log 2(Nb_bus) bits and a register of size log 2(Mux_t) bits for the management of the read-access authorizations, Mux_t being defined by the relation $$Mux\_t = F_{archi}/F_{pixel}.$$

11. The device as claimed in claim 10, wherein the computation tiles are addressed by a temporal multiplexing whose ratio is defined by the relation:

$$Mux\_t = F_{archi}/F_{pixel}.$$

12. The device as claimed in claim 10, wherein the computation tiles each comprise a serial block comprising an equal number of data registers to the number of processing units of the computation tile considered, each serial block of a computation tile receiving, as input, data originating from the processing units of the computation tile considered and being connected at output to the input/output unit of said computation tile.

13. The device as claimed in claim 10, wherein the processing units each comprise a processor comprising:
   two instruction decoders;
   a first set of multiplexers;
   computation operators;
   a second set of multiplexers;
   data registers; and
   a local memory, wherein
   the instruction decoders receive instructions originating from a control unit,
   the first set of multiplexers direct the data to be processed on one or two computation operators of the set of the available operators,
   the second set of multiplexers direct the processed data toward the data registers, and
   the processor executes up to two instructions per clock cycle of the processor.

14. The device as claimed in claim 10, wherein data of the stream are concatenated with a complementary datum, computation tiles being able to dissociate the data of the stream from the complementary datum so that the processing units of said computation tiles carry out instructions on the data of the stream as a function of the complementary datum.

15. The device as claimed in claim 14, wherein the concatenation of data of the stream with a complementary datum is carried out by an insertion operator inserted on the interconnection means.

16. The device as claimed in claim 1, further comprising a first counter CPTC and a second counter CPTL, the first counter CPTC being incremented after each incoming datum and being reset to zero each time it reaches the value Nc, the second counter CPTL being incremented each time the first counter CPTC reaches the value Nc and being reset to zero each time it reaches the value Vl, the incoming datum being stored in a cell of the block of shaping memories whose row index corresponds to the value of the second counter CPTL and whose column index corresponds to the value of the first counter CPTC.

* * * * *